Figure 1:
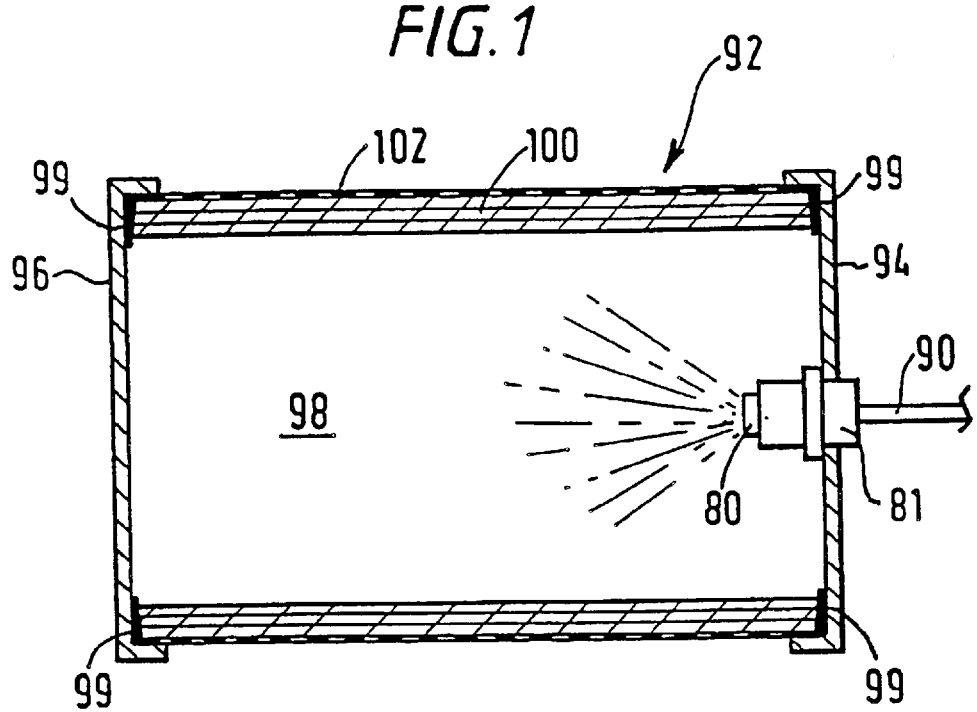

United States Patent

Hunter et al.

[11] Patent Number: 5,814,133
[45] Date of Patent: Sep. 29, 1998

[54] TREATMENT OF GAS STREAMS

[75] Inventors: Alex G. Hunter; John L. Oakton, both of Bowburn, Great Britain

[73] Assignee: Process Scientific Innovations Limited, Durham, Great Britain

[21] Appl. No.: 722,206

[22] PCT Filed: Apr. 13, 1995

[86] PCT No.: PCT/GB95/00862

§ 371 Date: Nov. 26, 1996

§ 102(e) Date: Nov. 26, 1996

[87] PCT Pub. No.: WO95/28219

PCT Pub. Date: Oct. 26, 1995

[30] Foreign Application Priority Data

Apr. 15, 1994 [GB] United Kingdom .................... 9407545
Nov. 23, 1994 [GB] United Kingdom .................... 9423640

[51] Int. Cl.$^6$ ................................................. B01D 46/00
[52] U.S. Cl. ............................. 95/288; 55/315.1; 55/319; 55/490.1; 55/524; 55/DIG. 17; 62/6; 62/238.6; 62/401; 95/273; 96/226
[58] Field of Search .......................... 95/288, 289, 273, 95/284; 55/DIG. 17, 267, 268, 269, 319, 524, 315.1, 490.1; 261/100, 101, DIG. 43; 62/6, 401, 238.6, 640; 96/226

[56] References Cited

U.S. PATENT DOCUMENTS

| 357,703 | 2/1887 | Cullingworth | 55/268 |
| 1,443,435 | 1/1923 | Rohrer | 55/267 |
| 1,458,005 | 6/1923 | Rohrer | 55/267 |
| 2,669,321 | 2/1954 | Schmidlin | 55/267 |
| 3,247,681 | 4/1966 | Hankison et al. | 55/268 |
| 3,380,553 | 4/1968 | Gibel | 55/319 |
| 3,426,508 | 2/1969 | McGrath | 55/267 |
| 3,955,945 | 5/1976 | Bauer | 55/319 |
| 4,237,696 | 12/1980 | Coblentz | 55/269 |
| 4,242,110 | 12/1980 | Hynes | 55/DIG. 17 |
| 4,242,111 | 12/1980 | Arends et al. | 55/269 |
| 4,555,912 | 12/1985 | Bogosh | 55/269 |
| 4,680,941 | 7/1987 | Richardson et al. | 62/238.6 |
| 4,831,828 | 5/1989 | Klusmier et al. | 62/6 |
| 4,848,988 | 7/1989 | Suzuki | 55/269 |
| 5,634,517 | 6/1997 | Linden et al. | 55/267 |

FOREIGN PATENT DOCUMENTS 2 073 045 10/1981 United Kingdom .
WO 88/02658 4/1988 WIPO .

Primary Examiner—Duane S. Smith
Attorney, Agent, or Firm—Oblon, Spivak, McClelland, Maier & Neustadt, P.C.

[57] ABSTRACT

A closed hollow filter canister having gas-impermeable end walls (94, 96) and a gas-permeable side wall (100). Gas contaminated with liquid is sprayed under pressure through line (90) and flow-restricting orifice (80) into the interior space of the canister where the contaminants become atomized and are retained by the side wall (100). Gas free of liquid contaminants passes into the atmosphere. In a preferred embodiment the gas is air contaminated with water, and the wall (100) is of cellulosic material which becomes wetted with water which gradually volatilizes. The filter canister may be used to treat streams (90a, 90b) from a gas compressor (50) and an associated reservoir tank (125).

55 Claims, 6 Drawing Sheets

TREATMENT OF GAS STREAMS

BACKGROUND OF THE INVENTION

1. Field of the Invention

This invention relates to a filter canister for the treatment of gas streams. The invention has particular although not exclusive relevance to the separation of contaminants within the compressed gas stream and may also be used as a cooling device. The present invention has applications in the treatment of compressed gas obtained from either a gas bottle or container or a compressor.

2. Discussion of the Background

Condensed water vapour and other vapours present as impurities in a gas stream can reduce the performance of oil removal filters, membrane filters and other fine tolerance devices. This invention is also concerned with the removal of liquid contaminants e.g. water, together with less volatile contaminants such as the oil from an oil lubricated compressor and liquid and/or particulate contaminants from an oil free compressor.

International Publication No WO93/18843, the disclosure of which is incorporated herein by reference, discloses an apparatus for providing a supply of compressed air comprising compressor means arranged to compress air and provide an output stream at an elevated temperature containing water vapour and contaminants from the compressor; cooling means arranged to cool the compressed air stream to near or below ambient temperatures; cleaning means that receives the compressed air from the cooling means and is arranged to separate liquid water and contaminants from the compressed air and to provide an output steam of relatively clean air and a waste stream of air carrying liquid water and contaminants; and flow restriction means through which the waste stream from the cleaning means is discharged to atmosphere, said flow restriction means being arranged to direct the emergent waste stream which has become cooled, on expansion to atmospheric pressure, onto a portion of the output stream defining a heat exchanger so that the emergent waste stream is warmed and water which has become atomised on emergence from the flow restriction means recondenses to a negligible extent.

The invention disclosed in the above international publication also includes a method for providing a supply of compressed air including the steps of compressing air by means of a compressor to give a compressed air stream at an elevated temperature containing water vapour and contaminants from the compressor; cooling the compressed stream to near or below ambient temperature; passing the cooled compressed air stream to a cleaner at which the compressed air stream becomes divided into an output stream of relatively clean air and a waste stream or air carrying liquid water contaminants; and discharging the waste stream to atmosphere through flow restriction means from which a discharged waste stream which is cooled as it emerges from the flow restriction means is directed so as to exchange heat with the compressed air stream along part of the travel of the compressed air stream from the compressor to the cleaner and becomes warm so that the water which becomes atomised on emergence from the flow restriction means does not recondense.

Two forms of canister are disclosed in the above mentioned international publication. In one form the emergent waste stream which rises vertically is led from a reducing or needle valve through a relatively small pipe into the interior of the canister chamber where it passes up a riser pipe surrounded by a heat exchange coil containing moist warm gas from the compressor. A problem with this arrangement is that expansion of the effluent-air mixture entering the canister chamber is restricted so that evaporation of the water may be incomplete. Incompletely evaporated water may drop down to the bottom of the canister and form a pool, or water may pass as droplets out of the top of the canister both of which are undesirable.

A second canister disclosed in the above international publication takes the form of an open top canister having an orifice at the base of the canister to receive the water-contaminated effluent air stream which is allowed to expand within the canister and exchange heat with a cooling coil carrying the stream of warm air from the compressor. However, this canister suffers from the following disadvantages: (i) the orifice from which the effluent air stream is discharged to atmosphere is open to the environment and can become contaminated or blocked; (ii) if water from the orifice is incompletely evaporated, it can condense on the interior of the canister and form a pool at the bottom; (iii) incomplete evaporation leads to inefficient cooling i.e. the cooling potential of the waste water is not realised; and (iv) the performance of the canister is reduced in RH values in excess of about 60% due to insufficient ambient air contact to allow full evaporation.

In both forms of the apparatus disclosed in the above international publication it is necessary to feed back an effluent air stream containing approximately 17% of the air from the compressor and expand that air stream in the canister to bring about the necessary evaporation of water, and it is an object of the invention to provide a canister that can be adapted to form part of a compressor system that will reduce the proportion of the air from the compressor that needs to be fed back in this way and thereby improve the efficiency of the system.

SUMMARY OF THE INVENTION

In one aspect the invention provides a closed hollow canister having at least one permeable wall through which gas and vapor but not liquid contaminants can pass freely and an atomizer providing an inlet to the interior of the canister.

In a second aspect the invention provides an apparatus for treating a compressed gas stream, comprising a filter chamber having an inlet for receiving the compressed gas stream, which may contain liquid contaminants, a filter for filtering liquid contaminants from the received gas stream, a first outlet for providing an output stream of compressed gas of reduced contaminant content and a second outlet for providing a waste stream of compressed gas carrying the liquid contaminants filtered from said received gas stream; a closed hollow canister having at least one permeable wall through which gas and vapor but not liquid contaminants can pass freely and an atomizer providing an inlet to the interior of the canister; and means for supplying said waste stream of gas carrying the liquid contaminants from the second outlet of said filter chamber to the atomizer of said canister. The compressed gas stream may be provided by an air compressor whose output is directly fed into an airline where the air passes to downstream equipment. However, there may also be used a source of stored compressed air, which when discharged into an air line may have similar water and other impurities such as contaminants therein. In particular, there may be used an air compressor which is arranged to operate intermittently and to feed its output into a reservoir tank which in turn acts as a source of compressed air for the air line. It will also be appreciated that the force may provide any gas or vapor, although the primary intended use of the invention is for atmospheric air.

The present invention also provides a method of disposing of liquid contaminant extracted from a stream of compressed gas, comprising the steps of providing a closed hollow canister having at least one permeable wall through which gas and vapor but not liquid contaminants can pass freely and an atomizer providing an inlet to the interior of the canister; feeding a waste stream of compressed gas together with the extracted liquid contaminant to the atomizer so that as the waste stream and liquid contaminant pass from the atomizer (i) the waste stream of compressed gas expands substantially to atmospheric pressure within the canister and (ii) the liquid contaminants become atomized and partly vaporized.

The present invention also provides a method of disposing of liquid contaminant extracted from a stream of compressed gas, comprising the steps of providing a closed hollow canister having at least one permeable wall through which gas and vapor but not liquid contaminants can pass freely and an atomizer providing an inlet to the interior of the canister; feeding a waste stream of compressed gas together with the extracted liquid contaminant to the atomizer so that as the waste stream and liquid contaminant pass from the atomizer (i) the waste stream of compressed gas expands substantially to atmospheric pressure within the canister and (ii) the liquid contaminants become atomized and partly vaporized.

The present invention also provides a method of providing a supply of compressed gas, comprising the steps of providing a compressed gas stream which may contain liquid contaminants; cleaning the compressed gas stream to separate the liquid contaminants from the stream and to provide (i) an output stream of compressed gas of reduced contaminant content, and (ii) a waste stream of compressed gas carrying the liquid contaminants; providing a closed hollow canister having at least one permeable wall through which gas and vapor but not liquid contaminants can pace freely and an atomizer providing an inlet to the interior of the canister; and supplying said waste stream together with the liquid contaminants to said atomizer so that as the waste yes stream and the liquid contaminants press from the atomizer (i) the waste stream of compressed gas expands substantially to atmospheric pressure within the canister; and (ii) the liquid contaminants become atomized and partly vaporized.

The present invention on also provides a method of separating a first liquid having a first volatility from a second liquid having a second volatility which is higher than the volatility of the first liquid, the method comprising the steps of providing a closed hollow canister having at least one permeable wall through which gas and vapor but not liquid contaminants can pass freely and an atomizer providing an inlet to the interior of the canister; feeding a stream of compressed gas together with a mixture of the first and second liquid to the atomizer so that as the received gas and mixture past from the atomizer (i) the waste stream of compressed gas expands substantially to atmospheric pressure within the canister; (ii) said first and second liquids become atomized; (iii) the atomized higher volatility second liquid partly vaporizes; (iv) atomized second liquid which does not vaporize soaks into said permeable wall and evaporates into the surrounding atmosphere; and (v) atomized first liquid collects within the canister.

A feature of the invention is that the water within a waste air stream, which may have other contaminants such as oil from the compressor that do not vaporise upon leaving a flow restricting device, is adsorbed/absorbed into the matrix of the canister, wetting it. The water within the matrix evaporates/transpires into the surrounding atmosphere, which evaporation/transpiration can be assisted by locating the canister in an air current e.g. at the inlet of a compressor motor cooling fan, giving rise to forced evaporation and positive cooling of the medium. Therefore the interior space of the canister can be positively cooled not only by natural evaporation/transpiration but by forced evaporation, and the stream of gas from the compressor can be positively cooled as it passes through the canister provided that water is present in the gas-permeable wall even though the flow of waste gas is temporarily interrupted. It is therefore an advantage of the apparatus of the invention that the operation of the compressor can be intermittent and/or the return flow of waste air and effluent can also be intermittent without loss of the facility for positive cooling of the gas flowing through the filter canister. The cooling effect does not depend solely on the expansion of compressed water-containing gas but is also at least partly due to the wetness of the medium through which the gas flow passes.

BRIEF DESCRIPTION OF THE DRAWINGS

Embodiments of the invention will now be described, by way of example only, with reference to the accompanying drawings in which:

FIG. 1 schematically shows in cross section a first form of canister according to the present invention;

FIG. 2 is a diagram showing a gas compressor and associated reservoir tank, with the canister of FIG. 1 arranged to receive liquid-contaminated airstreams from the compressor and tank and separate the contaminants from the air to be vented to atmosphere;

FIG. 3 is a diagram showing a second form of the canister fitted between an air compressor and a filtration device;

FIG. 4 shows an alternative arrangement for the filter canister and a heat exchanger in an air compression and filtration system of the general kind shown in FIG. 3;

FIG. 5 shows a container for receiving a filter canister according to the invention and for fitting into a cooling air inlet of a gas compressor;

FIG. 6 shows a container for receiving a filter canister according to the invention and an electric fan arrangement when used with a compressor without a cooling fan; and FIG. 7 is a diagrammatic section of a further form of the filter canister.

DETAILED DESCRIPTION OF THE PREFERRED EMBODIMENTS

The canister (92) of FIG. 1 has a cylindrical body and comprises solid end plates (94, 96) which in this embodiment are of moulded polybutylene terephthalate 30% glass filled. An interior space (98) of the canister (92) between the end walls or plates (94, 96) is closed by means of a side wall (100) which is a cylindrical gas and vapour-permeable and liquid-adsorbent/absorbent coalescing medium, referred to hereinafter as a gas-permeable medium. Suitable materials which could be used for the side wall (100) include a 100% polyester needle felt supplied by Webron Products Limited of Bury, Lancashire, a non-woven 50% nylon and 50% polyester sheet from Lantor UK Limited, a needle punched 100% polyester felt which is available from Edward W. Andrew Limited, raw glass fibre from Evanite Fibre Corporation or a glass fibre paper medium.

Located in one of the end walls (94) there is a flow restricting device (80) such as an orifice or a plurality of orifices in an orifice plate. The flow restricting device is secured to the end plate (94) by a bolt (81) through which a conduit (90) passes and attaches to the input (not shown) of the flow restricting device (80).

If desired on the internal and/or external face of the side wall (100) there may be a cylindrical foraminous metal sleeve (102) for support purposes. The end walls (94, 96), the side wall (100) and the foraminous sleeve(s) (102) are held together by known means e.g. by being bonded together by a resin (99).

When a pressurised gas stream containing liquid contaminants passes into the interior space (98) of canister (92) via conduit (90) and flow restricting device (80), the contaminants atomise and the waste airstream expands. Some of the liquid contaminants vaporise into the expanding gas stream and pass through the gas-permeable side wall (100). The remainder of the contaminants land on the inside surface of side wall (100) and may soak into it. Some of the contaminants that soak into the side wall (100) may evaporate/transpire into the surrounding atmosphere, depending on the volatility of the contaminant. For example, contaminants such as water will readily evaporate/transpire from the side wall (100) while other contaminants such as hydrocarbons will not do so or will do so incompletely.

As a result of gas expansion and the vaporisation of some of the liquid contaminants leaving the flow restricting device (80), the interior space (98) of the canister (92) is cooled. Further, after the side wall (100) has become moistened, this cooling effect is maintained even when flow from the flow restricting device (80) is interrupted because evaporative cooling takes place as some of the contaminants evaporate from the side wall (100). In this way, canister (92) acts as a heat sink and can be used as a cooling device. Furthermore, the canister (92) can also be used as a contaminant separator since the liquid contaminants atomise and separate upon leaving the flow restricting device (80).

In a variation, it has been found that a length of plastic pipe of diameter less than 1 mm will also provide sufficient flow restriction. Such a plastic pipe has the advantage that the length and diameter thereof can be selected having regard to the flow rate and other conditions to achieve the pressure drop required for a given installation. Typically the tube may be 30 mm long and of diameter 0.4 mm, although variations from this may be made in other installations. The use of a tube as aforesaid has the further advantage over an orifice plate that it is more difficult to block because the flow restriction is over an extended length of relatively wide diameter tube, and also that the dimensions of the tube are easier to change than in the case of an orifice plate, giving greater flexibility in adaptation to upstream equipment. Alternatively, a molded misting nozzle such as those supplied by Lurmark Limited Longstanton, Cambridge, may also be used as the flow restricting device and have the advantage of relative cheapness and ease of replacement should it become blocked with debris. These misting nozzles also have the advantage of producing a defined spray pattern and droplet size. In a further variation, a pressure reducing valve may be used as the flow restriction device alone or in combination with another flow restricting device. This has the advantage that the exit velocity of the contaminants can be adjusted by adjusting the valve without needing to replace the flow restricting device.

Figure 2:
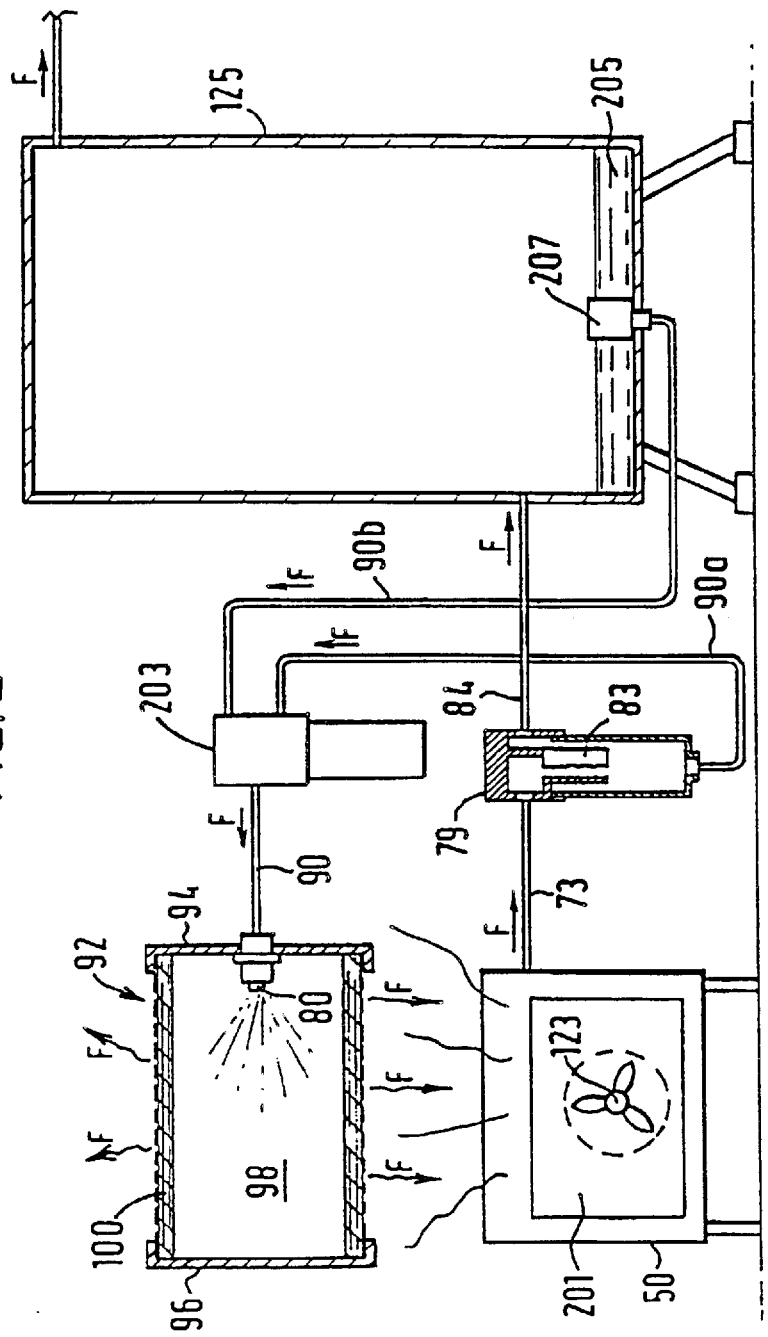

FIG. 2 schematically shows the canister (92) of FIG. 1 in use in a compressor system to provide cooling and effluent separation. The compressed air flow through the system is indicated by arrows marked F. The same parts of the canister as those shown in FIG. 1 are designated by the same reference numeral.

In FIG. 2, a compressor (not shown) is housed in a soundproof housing generally indicated by reference numeral (50) having an air inlet generally indicated by reference numeral (201) through which air is drawn by a compressor motor cooling fan (123). Vapour held within the atmospheric air condenses when the air is compressed and results in a liquid contaminant in the stream of compressed air. Other contaminants such as oil and debris caused by the wear of the compressor may also contaminate the output compressed airstream.

The compressed airstream from the compressor housing (50) is fed into filter chamber (79) via conduit (73). The filter chamber (79) comprises an in-to-out type filter (83) through which the compressed airstream and liquid contaminants pass. The filter (83) separates the liquid contaminants from the compressed airstream, which contaminants are collected at the base of the filter chamber (79) and fed with a small bleed of the compressed airstream, typically less than 6% by volume, via conduit (90a) and in-line filter (203) to the flow restricting device (80). The in-line filter (203) is provided to remove any solid particulate debris from the liquid contaminant that might block the flow restricting device (80). An automatic drain valve (not shown) could be inserted at the base of the filter chamber (79) to regulate the contaminant flow to the flow restricting device. Further, non-return valves (not shown) may be placed in the conduits (90a and 90b) connecting the reservoir tank (125) and the filter chamber (79) to the in-line filter (203), to ensure that the only exit for the contaminants is via the flow restricting device (80).

The cleaned compressed airstream leaving the filter chamber (79) via conduit (84) is fed into the reservoir tank (125) which is associated with or forms part of the compressor and is maintained at a super-atmospheric pressure, typically 5 to 7 bars. The compressed airstream usually enters the tank (125) at an elevated temperature compared with the temperature of the air within the tank (125) due to the loss of heat through the wall of the reservoir tank (125). As a result, the incoming compressed airstream cools and additional vapour condenses to form a pool (205) at the base of the reservoir tank (125). In the present embodiment, this liquid contaminant is removed from the reservoir tank (125) via an automatic float valve (207) and fed to the flow restricting device (80) via conduit (90b) and in-line filter (203). The purpose of providing a filter (203) separate from the housing (79) is to permit a single filter to deal with the liquid streams in both conduit (90a) and conduit (90b).

In the present embodiment, the contaminants leaving the in-line filter (203) will mainly comprise water and hydrocarbons from the lubricating oil of the compressor. As the waste airstream and contaminants leave the flow restricting device (80), the water and hydrocarbons atomise and the waste airstream expands causing a reduction in the relative humidity thereof. This reduction in relative humidity allows some of the atomised water to vaporise. Any unvolatised water and hydrocarbons impact onto the inside surface of the side wall (100) as previously described.

In the present embodiment, the purpose of side wall (100) is to allow air and vapour to pass freely therethrough and to retain and wick water to the external surface where the water can re-evaporate. Therefore, the gas-permeable medium preferably comprises an absorbent laminate material of the type disclosed in European Patent Publication No. EP 0151018 that comprises a hydrophilic layer of, for example, a naturally occurring cellulose fibre supported by a water-permeable fibrous web of for example polyester needle felt. Such a material has the ability to hold the large amount of water which can evaporate/transpire into the surrounding atmosphere. In order to exert a significant water-absorbent effect, the cellulosic or other hydrophilic fibres advantageously comprise more than 10% by weight of the weight of the gas-permeable wall (100). Advantageously, water does not under normal conditions recondense once it has left the canister.

The gas-permeable medium used may be plain as illustrated in FIG. 2, but is preferably pleated to maximise the amount of water that can be stored therein, and to maximise the external surface from which water can evaporate. Pleating may be achieved in the following manner: i) resin impregnate the filter material with a thermosetting resin, for example, a silicone or phenolic resin; ii) pre-heat the resin impregnated material to soften the resin; iii) fold the heated resin impregnated material to form the pleats, which may have a depth of 4.5 mm–15 mm; iv) cut and form the pleated material into the required shape; and v) cure the resin to hold the pleats in place by, for example, baking the pleated structure in an oven. Furthermore, the gas-permeable medium of the wall (100) may be treated with a germicide, e.g. GT 86-06 supplied by Actifresh of Ashby-de-la-Zouch, Leicestershire, in manner known per se to retard the growth of undesirable micro-organisms.

The hydrocarbons that land on the inside surface of the gas-permeable medium may soak into it but unlike water, the oil does not readily evaporate or transpire into the surrounding atmosphere and therefore builds up in the gas-permeable medium. However, by coating the fibres of the gas-permeable medium with an oleophobic coating, it is possible to impede or prevent the oil from being absorbed into the medium. As a result, the hydrocarbons will build up on the inside of the canister (92). In this way, the contaminant mixture of water and hydrocarbons is separated, allowing the water to evaporate from the side wall (100) of a canister (92) but leaving the hydrocarbons trapped within the canister (92).

As described above, the canister also acts as a heat sink and can be used to provide some additional cooling for the compressor unit by placing it in the air inlet of the compressor motor cooling fan (123).

Figure 3:
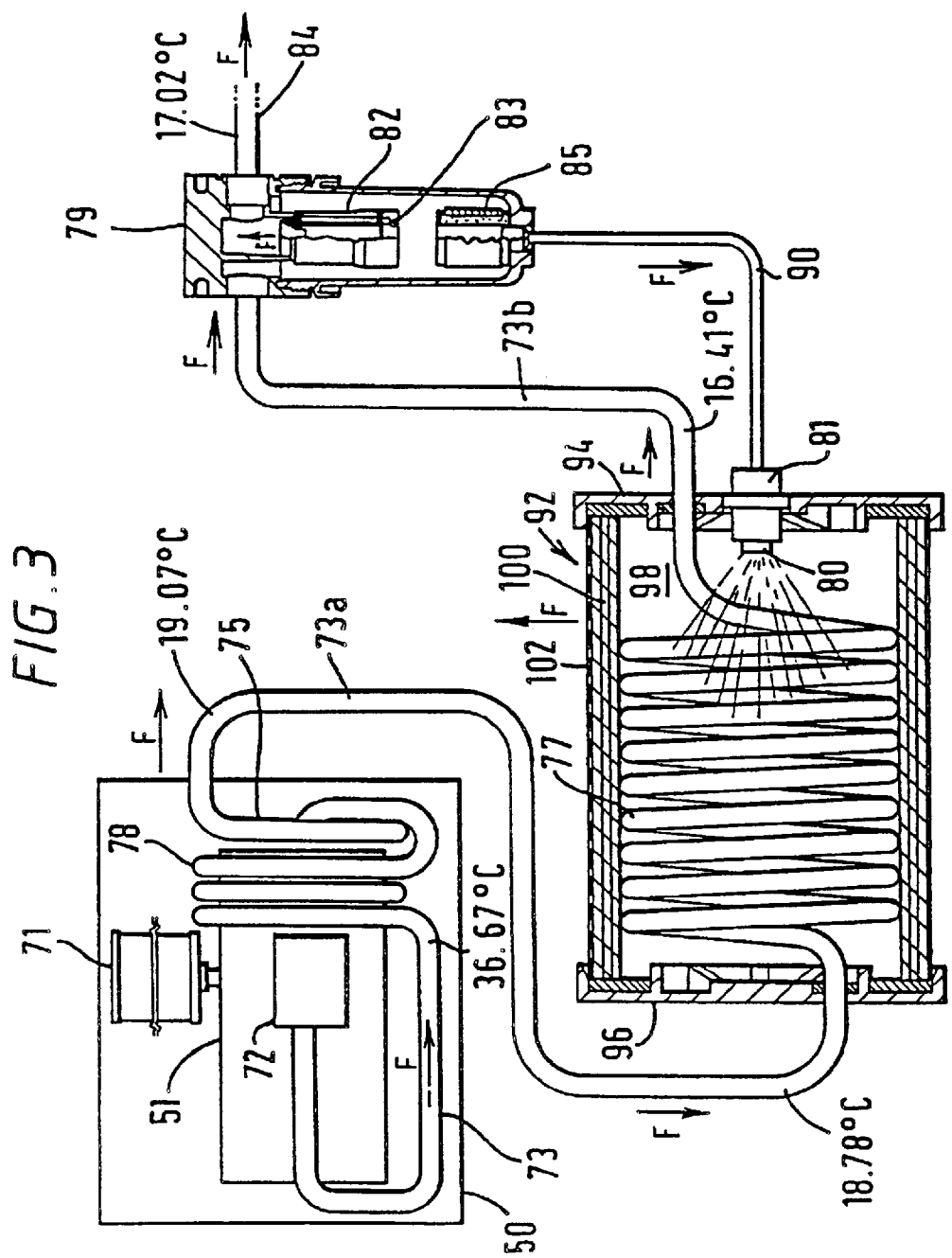

FIG. 3 diagrammatically shows how a second form of the canister of the present invention can be used to cool the compressed gas output from a compressor and simultaneously separate air and contaminants. In that figure, a compressor system is shown in which the compressed air flow through the system is indicated by arrows F. A compressor unit (51) having an external soundproof housing (50) has an intake filter. (71) through which air at an ambient temperature of about 17.5° C. enters the compressor (51), the filter having, for example, a solid particle cut-off of about 1 μm absolute, although more efficient filters could be used. The filter (71) is based on a pleated medium having a pre-filter wrapped around it of 17 μm nominal cut-off. It has been found that such a pre-filter and high efficiency particulate filter significantly reduces the dust which would otherwise enter the compressor and give rise to problems such as bearing overheating and blocked orifices and valves.

The compressor (51) contains a compression chamber diagrammatically represented by the reference numeral (72) from which air passes into a pipeline (73) which is of a corrosion resistant material and preferably is a good conductor of heat, e.g. plastic, stainless steel or copper which may be preferred because it has a higher thermal conductivity. The compressed gas stream which in this instance is at a temperature of about 37° C. enters a first group of cooling coils (78) which surround one end of the compressor (51) and a second group of spirally arranged coils (75) which are located in the inlet draught of a cooling fan which forms part of the compressor (51). The air current which cools the compressor motor and compressor heads therefore strongly cools the air stream passing through the coil (75), the coils (78) also cooling naturally.

The downstream part (73a) of the pipeline (73) in this instance contains air at about 19° C. which passes through a cooling coil (77) within the internal space (98) of the canister (92). An air flow pipe (73b) leads from the canister a stream of compressed air at a temperature of about 16.5° C. which is introduced into a filter chamber (79) containing a filter (83) shielded by a protective shield or baffle (82). The air from the pipe (73b) enters the chamber (79) contaminated with water droplets and other contaminants which are deflected from direct contact with the filter (83) by means of a shield or baffle (82). In the present embodiment, the airflow through the filter (83) is in an out-to-in direction though an in-to-out type filter could be used. In an oil free compressor, as in the present embodiment, an out-to-in type filter (83) in combination with the shield or baffle (82) is preferred since it prevents the filter media (not shown) from becoming wet with water and other liquid contaminants. If the media of filter (83) becomes wet the pressure drop through the filter increases which results in a lower system efficiency.

Once deflected by the shield or baffle (82), the air enters the underside of the filter (83) through an annular gap (not shown) in the base thereof. The filter (83) may employ a pleated or moulded glass filtration medium and typically has an efficiency of 99.9999% against 0.3 micron contaminants. The filter (83) is kept generally dry by the shield or baffle (82) and a stream of relatively pure dry (in the sense of no water in the liquid phase) compressed air flows through line (84) in this instance at a temperature of about 17° C. The compressed air at this point still contains water vapour, and typically at about 90% relative humidity (RH). The temperature rise in the gas passing through line (84) is the result of mild external heating caused by the ambient air.

Water and other contaminants tend to collect in the base of filter chamber (79) from which they are lead with a small bleed of the airflow via a conduit (90) to the flow restricting device (80) located in the end wall (94) of the canister (92). The waste gas stream is caused to pass from the interior space of the filter chamber (79) into the line (90) via a filter (85), which is preferably an ultra-high efficiency filter known per se the purpose of which is to prevent solids (e.g. compressor debris and products of wear) from reaching and blocking the flow restriction device (80).

Water-contaminated effluent air passes from the flow restricting device (80) into the interior space (98) of the canister (92) where it contacts the coil (77). The water content of the gas stream atomises and partly evaporates and any unevaporated water lands on the inside surface of the walls (94,96 and 100) where it eventually soaks through to the outside surface of the permeable medium (100) and evaporates/transpires into the surrounding atmosphere. It is preferable that heat exchange canister (92) is not confined in such a way that the air movement across the canister (92) is restricted, as this increases the risk of the surrounding atmosphere becoming saturated with water which may subsequently condense.

In a variant in which the compressor is oil lubricated, the effluent in the pipe (90) will inevitably be contaminated with lubricating oil and possibly fractions thereof. Under these conditions the oil is also atomised at the flow restriction device (80) and may soak into the permeable side wall (100). Unlike water, however, the oil does not readily evaporate or transpire into the surrounding atmosphere and therefore builds up in the medium of the wall (100). In time, and in the absence of any treatment with hydrophobic material such as fluorocarbon, the oil may form drops which are heavy enough to settle on the underside of the heat exchange canister (92) due to gravity. When the presence of oil becomes externally noticeable, the heat exchange canister (92) may be replaced or a new permeable medium (100) may be inserted into it, or the apparatus including the heat exchange canister (92) may be left running and any oil appearing on the outside of the canister may be collected. As the compressor (51) operates, the amount of oil stored within the side wall (100) increases and the amount of water that can be stored and evaporated decreases. This loss in ability to store and evaporate water results in a reduction in the capability of the canister (92) to remove the heat from the coil (77).

Consequently, in the case of an oil lubricated compressor, it is preferable to coat the fibres, making up the gas-permeable material, with an oleophobic coating to prevent oil, but not water, from being absorbed into the fibres of the material. In this case, the majority of the compressor oil will form globules on the internal surface of the gas-permeable medium which may, through gravity, coalesce to form a lake of oil which is retained within the canister. In this way, the amount of water that can be stored and evaporated/transpired from the side wall (100) can be maintained at a reasonably constant level provided that the volume of the liquid oil present is not permitted to become too great.

As the waste air stream leaves the flow restriction device (80), the change in pressure results in a reduction of the RH % of the waste air, e.g. 95% RH to 20% RH, allowing a rapid vaporisation of the atomised water which is assisted by the heat from the coil (77). The water that has not vaporised passes onto the inside surface of the wall (100) where it eventually passes into the surrounding atmosphere as previously described.

The sudden expansion of the waste gas stream and the vaporisation of the atomised water give rise to a significant cooling in the space (98). Furthermore, if the material in the side wall medium (100) is moist, interruption of the flow from the flow restricting device (80) does not necessarily lead to discontinuance of the cooling effect. When the discharge from the flow restricting device (80) is interrupted, the canister (92) will heat up due to the warm air passing through the coil (77). However, the heating is very slow since the canister (92) has "inertia" due to the mass of water stored in the side wall (100). Further, if the canister (92) is positioned so that the side wall (100) is in a draught, then due to the positive cooling that results from the evaporation/transpiration of water from the side wall (100), any heat passed from the coil (77) to the side wall (100) of the canister (92), by conduction, convection, radiation etc, is quickly lost to the surrounding atmosphere. In this way, the cooling effect can be maintained even when the discharge from the flow restricting device (80) is interrupted.

It has been found that this combined atomisation and wicking mechanism is more efficient at cooling the coil (77) than the evaporation mechanism as described in international publication W093/18843 and that less than 10% of the compressed air in the line (73) needs to be returned through the line (90) to the canister (92) as compared with about 17% in the system as described in the said international publication.

It is important that the gas passing through the coil (77) should be positively cooled to about, but preferably below, ambient temperature so that bulk water does not appear in the pipe (84) downstream of the filter chamber (79). The absence of water may be further ensured by arranging for the pipe (84) leaving the filter chamber (79) to pass around the compressor so that air within it becomes heated. This may be done as an alternative to or in combination with a pressure reducing valve (not shown) in the line (84) so that the relative humidity of the air passing from the filter chamber (79) is reduced and the risk of water recondensing downstream of the filter chamber (79) is minimised.

Figure 4:
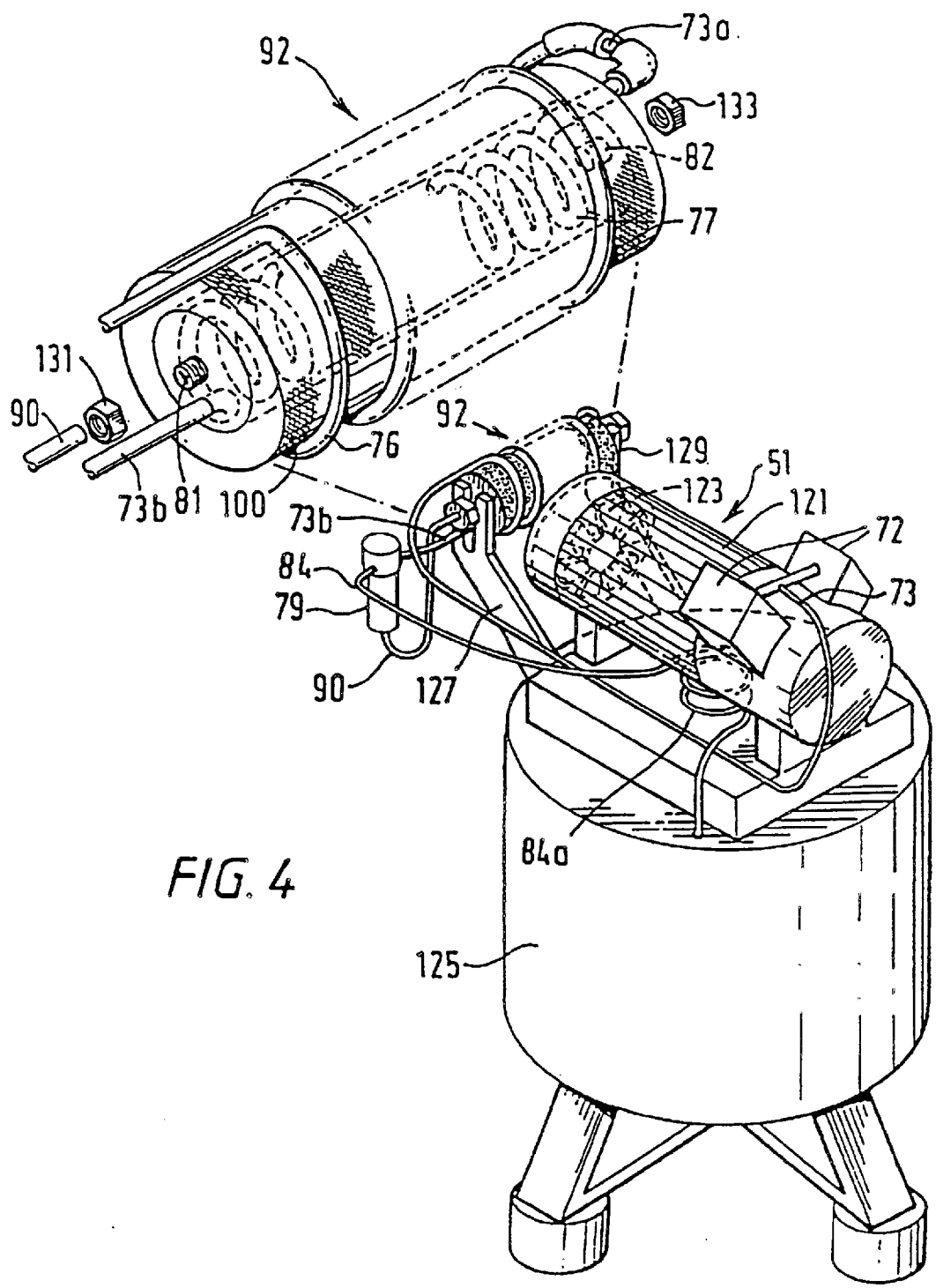

FIG. 4 is a perspective view showing the preferred operating position of a third form of the canister (92) relative to the compressor (51) and an exploded, partially fragmented perspective view of the canister (92). The same parts of the apparatus as those shown in FIG. 3 are designated by the same reference numerals and their operation will not be described again.

In FIG. 4, the compressor (51) is mounted on top of and arranged to feed compressed air into a reservoir tank (125). The compressor (51) comprises a compressor motor (121), a compressor motor cooling fan (123) and two cylinder heads (72). The two cylinder heads (72) have a separate intake filter (not shown) and their outputs are manifolded together to form a single output pipe (73). Preferably, the compressor (51) is arranged to work intermittently to maintain a pressure of, for example, 5 to 7 bar within the reservoir tank (125). In this embodiment, the primary coils (75, 78) are replaced by a single coil (76) wound spirally around the heat exchange canister (92) which is connected at one end to the compressor output pipe (73) and at the other to the coil (77) via conduit (73a). As in the compressor system shown in. FIG. 3, the output of coil 77 is fed via conduit (73b) into filter chamber (79) where the liquid contaminants are separated and fed back to the flow restricting device (not shown) in the end of the canister (92). The relatively dry compressed air in pipe (84) is heated in a coiled region (84a) located in a relatively warm area underneath the compressor motor (not shown) and fed into the reservoir tank (125). Compressed air can then be taken from the tank (125) as and when it is needed via an output line (not shown).

At each end of the canister (92) there is a bolt (81, 82) that allows the canister (92) to be mounted, in mounting brackets (127, 129), in the inlet draught of the compressor motor cooling fan (123). Nuts (131,133) are provided that fit onto the corresponding bolt (81,82) of the canister (92) to secure the canister (92) to the mounting brackets (127,129). Further, nut (131) and bolt (81) which has an axial hole as shown, are arranged to connect, in a manner known per se, the pipe (90) from the base of the filter chamber (79) to the flow restricting device (80).

There are several advantages of having the canister (92) and the primary coil (76) arranged in this manner. Firstly, the whole of the primary coil (76) is in the inlet draught of the compressor motor cooling fan (123), which improves the cooling thereof; secondly, the inlet draught increases the evaporation of water from the surface of the canister (92); thirdly, radiant heat gained by the canister (92) from the cylinder heads (72) is reduced; and finally, the air supplied to cool the compressor (51) is cooler than ambient due to the cooling effect of the canister (92).

In the unlikely event that further liquid contaminants turn up within the reservoir tank (125), a contaminant bleed line may be connected from the reservoir tank (125) to the flow restriction device (80), or to another separate flow restricting device in communication with the inside of the canister (92).

As described above, the canister (92) can work well with a compressor that works intermittently, cycling between a reservoir pressure of e.g. 5 to 7 bar. The venting through the line (90) can be intermittent rather than continuous. This may be arranged by providing a flow control valve (not shown) in the line (90) between the chamber (79) and the flow restricting device (80). Thus if in use there is a sufficient water content in the filter medium (100), flow of contaminated waste air through the pipe (90) may be interrupted and the evaporation of the water in the medium (100) will maintain the temperature of the interior space (98) of the filter canister relatively low, thereby continuing to provide a cooling effect on the gas passing through the coil (77). The interruption may be arranged to happen under manual control or cyclically on a timed basis or in response to build up of water in the chamber (79) or the measured dryness of the medium (100) or the measured temperature of the gas in the space (98). The avoidance of a need for a continuous bleed of air improves the operating efficiency.

The pipe (73b) between the filter (79) and the heat exchange canister (92) is preferably made relatively short and of a non-conducting plastics material to minimise the risk of reheating the air. Avoidance of reheating of the air that has been cooled in the coil (77) before it enters the chamber (79) is desirable so that there is minimal re-evaporation of water and the separation of water in the chamber (79) is as complete as possible. The heat exchanger (92) does not have to be next to the compressor but may be located further downstream. Also its axis does not have to be horizontal as shown in the illustrated embodiments, the heat exchange canister (92) could have its axis directed vertically or at any desired angle.

Figure 5:
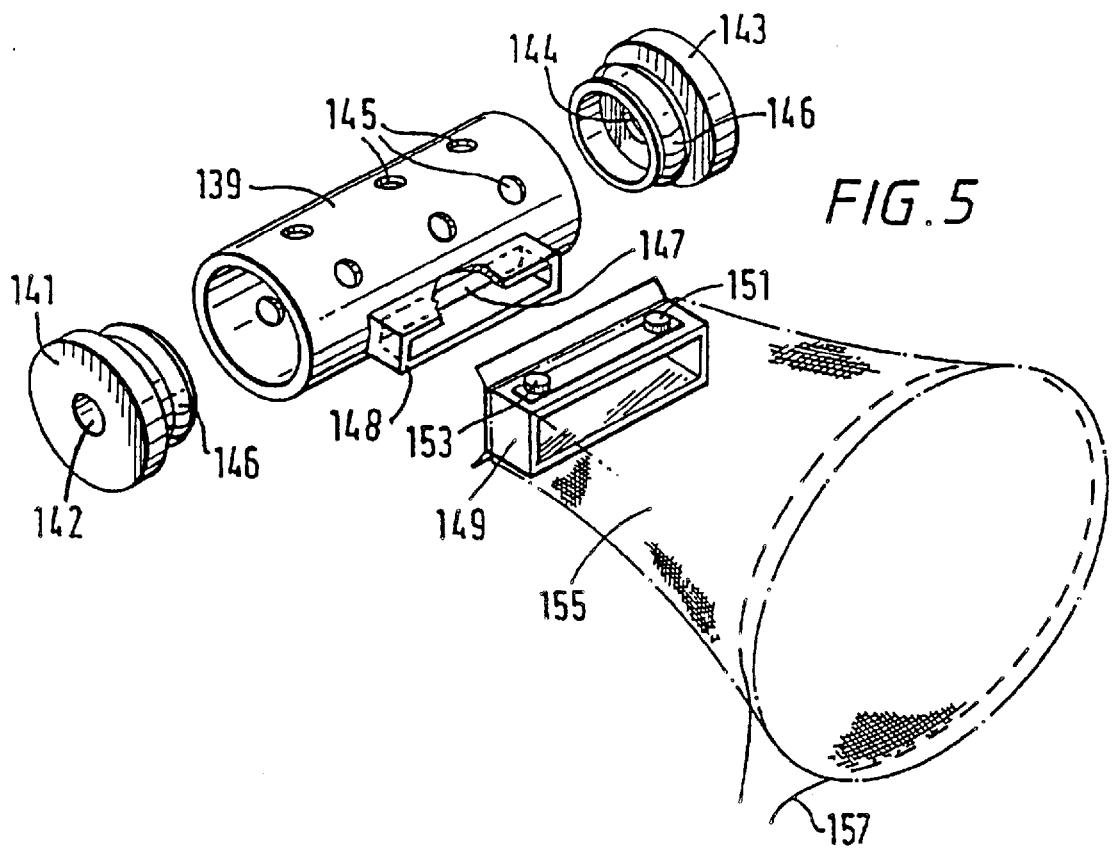

FIG. 5 shows a perspective view of a container (139) into which the canister (92) and the primary cooling coil (76) may be placed. The container (139) is preferably a light plastic air-impermeable tubing, having one or more holes (145) around its circumference through which air may pass. In a preferred embodiment, the holes (145) are evenly distributed around the circumference of the container (139) as shown in FIG. 5. The canister (92) is held within the container (139) by means of end plugs (141,143) which are arranged to fit securely into the respective ends of the container by, for example, O-ring piston seals (146) and have holes (142,144) arranged to receive the corresponding bolts (81,82) of the canister (92). The container (139) has an opening (147), such as a rectangular slit, and an attachment arrangement, such as a raised collar (148), extending around the periphery of the slit (147). The raised collar (148) is arranged to receive, around its periphery, a complementary second attachment arrangement (149) having a pair of tightening screws (151,153) for securing the second attachment arrangement to the raised collar (148) in a substantially airtight manner. One end of a shroud (155) is attached to the second attachment arrangement (149) in a substantially airtight manner, and the other end has a length of cord or "Velcro" (157) attached thereto for fastening the shroud (155) to the air inlet of the compressor cooling fan.

When the container (139) and shroud (155) are attached to the apparatus shown in FIG. 4 in the manner described above, then due to the operation of the compressor motor cooling fan (123), air enters through the holes (145) in the circumference of the container (139) and passes into the compressor cooling fan (123) via the rectangular slit (147) in the container and the shroud (155). As a result of the even distribution of holes (145) around the container (139), the air flow over the surface of the canister (92) is more evenly concentrated i.e. all the air flow entering the fan has first to pass through or over the canister (92) as compared with the air flow when no such container is present, and therefore more water is evaporated/transpired from the side wall (100) of the canister (92), giving a stronger cooling effect. Those skilled in the art will realise that the same even flow of air across the canister (92) can be achieved with many other configurations, for example if the holes (145) are made in the side of the container diametrically opposite the rectangular slit (147). The inventors have found experimentally that by increasing the evaporation/transpiration of water from the side wall (100) of the canister (92), the amount of bleed air required to be fed back from the filter (79), to maintain the same cooling effect, is reduced to under 6% of the compressed air in line (73).

Figure 6:
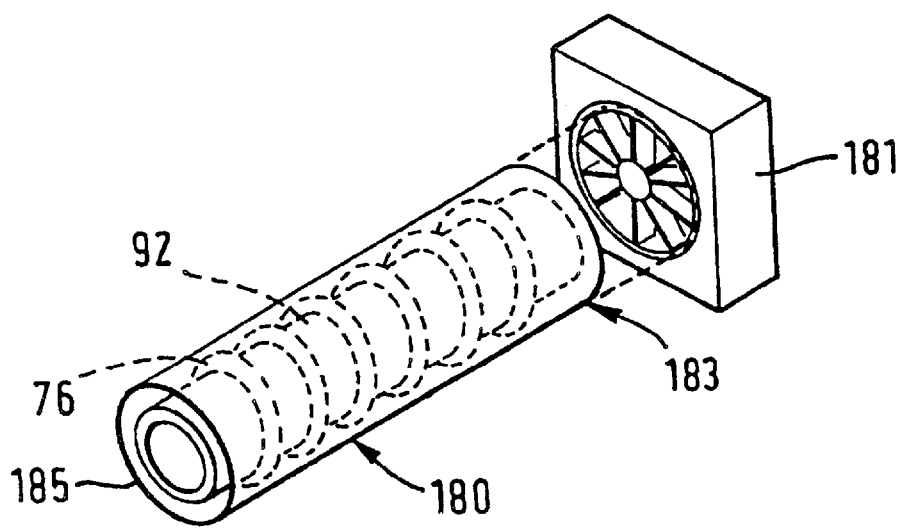

In the above embodiments, the canister is mounted adjacent to the cooling fan of the compressor to maximise the water that is evaporated from the canister (92). However, in embodiments where there is no compressor cooling fan, if the same performance is required then a separate cooling fan will have to be provided. FIG. 6 shows how such a cooling fan can be attached to a container for the canister (92). In particular, FIG. 6 shows an impermeable plastic container (180) which houses the canister (92) and an electric fan (181) that connects, in an airtight manner, to one end (183) of the impermeable plastic container (180). The other end (185) of, the container is open such that when the fan is switched on, air is either blown or drawn across the canister (92) which promotes evaporation of water from the canister (92).

Figure 7:
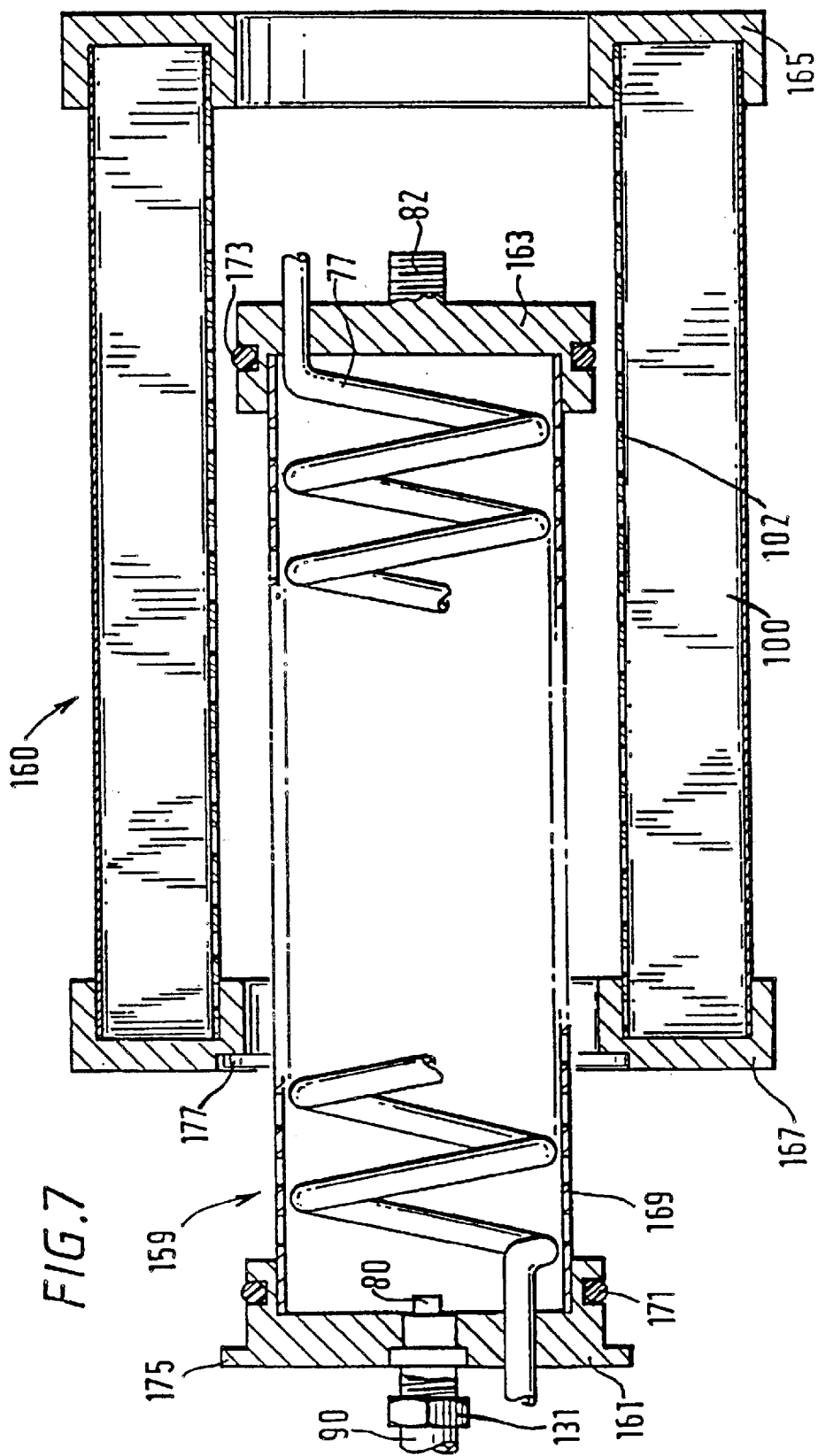

FIG. 7 shows in section a preferred structure of a further form of the canister (92) that allows replacement of the cylindrical gas-permeable medium (100). Parts of the canister (92) that are the same as those shown in FIG. 1 are designated by the same reference numerals and their operation will not be described again. The canister (92) comprises two main parts, a central part that can hold the helical coil (77) and the primary coil (not shown) where applicable, and a removable cylindrical gas-permeable sleeve generally indicated by reference numeral (160). The central part (159) is supported by a cylindrical foraminous metal sleeve (169) and has, at each end, a gas-impermeable end cap (161, 163) through which respective ends of the coil (77) pass. The removable cylindrical gas-permeable sleeve (160) comprises a pleated gas-permeable and liquid-coalescing medium (100) and an annular gas-impermeable end cap at each end (165, 167). Also provided is a metal foraminous sleeve (102), for support purposes, adjacent the internal wall of the gas-permeable medium (100).

The end caps (161, 163) are arranged to fit into the corresponding hole of the annular end caps (165,167) in a substantially air tight manner for which purpose a seal is made by means of O-rings (171, 173). End cap (161) has a flange (175) around its periphery which acts as a stop when the gas-permeable sleeve (160) is fitted onto the-central part (159). Annular end cap (167) has groove (177) arranged to receive the flange (175) of the end cap (161) so as to present a flush surface when the sleeve (160) is in the correct position. The pipe connecting the primary coil (not shown) to the coil (77) is arranged in a manner known per se such that it can be disconnected from the coil (77) to allow replacement of the gas-permeable sleeve (160).

What is claimed as new and is desired to be secured by Letters Patent of the United States is:

1. A closed hollow canister comprising: at least one permeable wall through which gas and vapor but not liquid contaminants can pass freely and an atomizer providing an inlet to the interior of the canister, wherein said permeable wall is a germicide treated wall.

2. The canister of claim 1, wherein said canister is tubular and further comprises gas-impermeable end walls and a gas permeable side wall, the atomizer being located in one of the gas-impermeable end walls.

3. The canister of claim 2, further comprising a foraminous support cylinder which extends between and is attached to the gas-impermeable end walls for supporting the gas permeable side wall.

4. The canister of claim 3, wherein foraminous support cylinders are provided to the inside and to the outside of the side wall.

5. The canister of claim 1, wherein the atomizer includes an orifice in an orifice plate.

6. The canister of claim 1, wherein the atomizer includes an orifice plate having a plurality of orifices therein.

7. The canister of claim 1, wherein the atomizer includes a length of fine tubing.

8. The canister of claim 5, wherein the diameter of the orifice is less than 1 mm.

9. The canister of claim 1, wherein the atomizer includes a misting nozzle.

10. The canister of claim 1, wherein the atomizer includes a variable pressure reducing valve.

11. The canister of claim 2, wherein said atomizer includes a variable pressure reducing valve.

12. The canister of claim 1, wherein the permeable wall is comprised of a cellulosic material.

13. The canister of claim 1, wherein the permeable wall is pleated.

14. The canister of claim 1, wherein the permeable wall is molded or is a wrapped sheet.

15. The canister of claim 1, wherein the permeable wall is comprised of a fibrous material in which said fibers have been treated with an oleophobic material which impedes entry of hydrocarbons into said permeable wall.

16. The canister of claim 1, wherein the permeable wall is treated with a bactericide.

17. The canister of claim 1, wherein the permeable wall is treated with a fluorochemical.

18. The canister of claim 1, further comprising a heat exchanger in the interior space of the canister.

19. The canister of claim 1, further comprising a heat exchanger on the exterior of the canister adjacent the permeable wall.

20. The canister of claim 18, wherein said canister is comprised of first and second complementary parts, the first complementary part which contains the heat exchanger for the interior space of the canister fitting removably into the second complementary part which supports the permeable wall and is disposable.

21. An apparatus for treating a compressed gas stream, comprising:

a filter chamber having an inlet for receiving the compressed gas stream which may contain liquid contaminants, a filter for filtering liquid contaminants from the received gas stream, a first outlet for providing an output stream of compressed gas of reduced contaminant content and a second outlet for providing a waste stream of compressed gas carrying the liquid contaminants filtered from said received gas stream;

a closed hollow canister having at least one permeable wall through which gas and vapor but not liquid contaminants can pass freely and an atomizer providing an inlet to the interior of the canister; and means for supplying said waste stream of gas carrying the liquid contaminants from the second outlet of said filter chamber to the atomizer of said canister.

22. The apparatus of claim 21, further comprising a heat exchanger for cooling the compressed gas stream before the compressed gas stream reaches the inlet of said filter chamber.

23. The apparatus of claim 22, wherein at least a portion of the heat exchanger is provided within the interior of the canister for exchanging heat with gas and liquid emerging from the atomizer of the canister.

24. The apparatus of claim 22, wherein at least a portion of the heat exchanger is provided at the exterior of the canister adjacent the permeable wall.

25. The apparatus of claim 21, further comprising a cooling fan for cooling the canister.

26. The apparatus of claim 21, further comprising a reservoir tank having an inlet for receiving the compressed gas from said first outlet of said filter chamber and a conduit for feeding a flow of contaminant that collects in the tank to said canister.

27. The apparatus of claim 21, further comprising a solids filter between the second outlet of said filter chamber and the atomizer of said canister for removing solids from the waste stream of compressed gas.

28. The apparatus of claim 21, further comprising a flow controller for establishing an intermittent flow of said waste stream and liquid contaminants between the filter chamber and the canister.

29. The apparatus of claim 21, wherein said liquid contaminants comprise liquid water and, as the waste stream of compressed gas and liquid water passes from the atomizer, (i) the waste stream of compressed gas expands substantially to atmospheric pressure within the canister; (ii) the liquid water contaminant atomizes and partly vaporizes; and (iii) atomized water which does not vaporize soaks into said permeable wall and evaporates into the surrounding atmosphere.

30. The apparatus of claim 29, wherein said liquid contaminants further comprise liquid hydrocarbons mixed with said liquid water, said liquid water and said liquid hydrocarbons atomize upon passing from the atomizer into the interior of the canister, and the atomized hydrocarbons collect within the canister.

31. The apparatus of claim 30, wherein said permeable wall coalesces atomized hydrocarbons which land thereon.

32. The apparatus of claim 21, wherein said atomizer allows less than 6% by volume of said compressed gas stream to expand into the interior of said canister.

33. An apparatus for providing a supply of compressed gas, comprising:

a source of compressed gas for supplying an inlet stream of compressed gas which may contain liquid from the received gas stream, a first outlet for providing an output stream of compressed gas of reduced contaminant content and a second outlet for providing a waste stream of compressed gas carrying the liquid contaminants filtered from said received gas stream;

a closed hollow canister having at least one permeable wall through which gas and vapor but not liquid contaminants can pass freely and an atomizer providing an inlet to the interior of the canister; and means for supplying said waste stream of gas carrying the liquid contaminants from the second outlet of said filter chamber to the atomizer of said canister.

34. The apparatus of claim 33, wherein the supply means includes a gas compressor.

35. The apparatus of claim 34, wherein the compressor is an air compressor.

36. The apparatus according to claim 34, wherein the compressor includes a mechanism for starting and stopping the compressor intermittently.

37. The apparatus of claim 34, wherein the compressor includes an air intake having an intake filter attached thereto.

38. The apparatus of claim 37, wherein said intake filter has a solid particle cut-off of about 1 μm absolute.

39. The apparatus of claim 34, wherein said compressor includes a cooling fan, and said canister is located adjacent to an air inlet of the cooling fan.

40. The apparatus of claim 39, further comprising an air duct leading to the cooling fan, wherein the canister is located within the air duct so that air is drawn past the permeable wall and into the cooling fan.

41. A method of disposing liquid contaminant extracted from a stream of compressed gas, said method comprising the steps of:

providing a closed hollow canister having at least one permeable wall through which gas and vapor but not liquid contaminants can pass freely and an atomizer providing an inlet to the interior of the canister;

feeding a waste stream of compressed gas and the extracted liquid contaminant to the atomizer so that as the waste stream and the liquid contaminant pass from the atomizer (i) the waste stream of compressed gas expands substantially to atmospheric pressure within the canister and (ii) the liquid contaminants become atomized and partly vaporized.

42. A method of providing a supply of compressed gas, said method comprising the steps of:

providing a compressed gas stream which may contain liquid contaminants;

cleaning the compressed gas stream to separate the liquid contaminants from the stream and to provide (i) an output stream of compressed gas of reduced contaminant content, and (ii) a waste stream of compressed gas carrying the liquid contaminants;

providing a closed hollow canister having at least one permeable wall through which gas and vapor but not liquid contaminants can pass freely and an atomizer providing an inlet to the interior of the canister; and supplying said waste stream together with the liquid contaminants to said atomizer so that as the waste gas stream and the liquid contaminants pass from the atomizer (i) the waste stream of compressed gas expands substantially to atmospheric pressure within the canister; and (ii) the liquid contaminants become atomized and partly vaporized.

43. The method of claim 41 or 42, wherein said liquid contaminant comprises water, and wherein atomized water which does not vaporize soaks into said permeable wall and evaporates into the surrounding atmosphere.

44. The method of claim 43, wherein liquid hydrocarbons are mixed with said liquid water contaminant and wherein said liquid water contaminant and said liquid hydrocarbons atomize upon passing from said atomizer and wherein the atomized hydrocarbons collect within the canister.

45. The method of claim 44, wherein atomized hydrocarbons soak into said at least one permeable wall.

46. The method of claim 44, wherein hydrocarbons coalesce on said at least one permeable wall.

47. The method of claim 42 or 43, further comprising the step of placing said canister within a current of air which cools the interior space of the canister by natural evaporation of liquid contaminants in the permeable well.

48. The method of claim 42 or 43, further comprising the step of locating said canister within a current of air which cools the interior space of the canister by forced evaporation of liquid contaminants in the permeable wall.

49. The method of claim 42 or 43, wherein said waste stream comprises less than 6% by volume of said compressed gas stream.

50. A method of separating a first liquid having a first volatility from a second liquid having a second volatility which is higher than the volatility of the first liquid, the method comprising the steps of:

providing a closed hollow canister having at least one permeable wall through which gas and vapor but not liquid contaminants can pass freely and an atomizer providing an inlet to the interior of the canister;

feeding a stream of compressed gas and a mixture of the first and second liquid to the atomizer so that as the received gas and the mixture pass from the atomizer (i) the waste stream of compressed gas expands substantially to atmospheric pressure within the canister; (ii) said first and second liquids become atomized; (iii) the atomized second liquid partly vaporizes; (iv) the atomized second liquid which does not vaporize soaks into said permeable wall and evaporates into the surrounding atmosphere; and (v) the atomized first liquid collects within the canister.

51. The method of claim 50, wherein said first liquid comprises liquid hydrocarbons and wherein said second liquid comprises water.

52. The method of claim 51, wherein upon passing from said atomizer, liquid hydrocarbons atomize and soak into said at least one permeable wall.

53. The method of claim 50, wherein upon passing from said atomizer, liquid hydrocarbons atomize and coalesce on said at least one permeable wall.

54. The canister of claim 6, wherein the diameter of each orifice is less than 1 mm.

55. The canister of claim 7, wherein the diameter of the length of fine tubing is less than 1mm.

* * * * *